United States Patent
Brezovnik et al.

(10) Patent No.: US 6,640,693 B2
(45) Date of Patent: Nov. 4, 2003

(54) FOOD PROCESSOR

(75) Inventors: Peter Brezovnik, Mozirje (SL); Henrik Pavlovic, Ljubno Ob Savinji (SL); Jurij Pesec, Petrovce (SL); Igor Zibret, Smartno Ob Paki (SL)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/260,325

(22) Filed: Sep. 30, 2002

(65) Prior Publication Data

US 2003/0066438 A1 Apr. 10, 2003

Related U.S. Application Data

(63) Continuation of application No. PCT/EP01/02080, filed on Feb. 23, 2001.

(30) Foreign Application Priority Data

Mar. 31, 2000 (DE) .......................... 100 16 302

(51) Int. Cl.[7] .............................. A23L 1/00; A23N 1/00; A47J 43/08; A47J 44/00; B01F 9/00
(52) U.S. Cl. ........................ 99/348; 99/492; 99/511; 366/287; 366/314; 366/601
(58) Field of Search ................. 99/326–333, 337, 99/338, 348, 484–486, 489, 492, 495, 509–513; 210/380.1, 360.1; 241/37.5, 73, 92, 86.1, 89.3, 282.2, 282.1, 261.1, 101.2, 199.12; 366/144–149, 205, 206, 601, 96–98, 197, 198, 287, 288; 219/492, 494, 497, 521; 494/36, 43, 56, 58; 426/61, 63, 49, 52, 533, 523, 599

(56) References Cited

U.S. PATENT DOCUMENTS

| | | | | |
|---|---|---|---|---|
| 3,635,147 A | * | 1/1972 | Lee | 99/348 |
| 5,031,518 A | * | 7/1991 | Bordes | 99/338 |
| 5,048,402 A | * | 9/1991 | Letournel et al. | 99/348 |

FOREIGN PATENT DOCUMENTS

| | | |
|---|---|---|
| DE | 30 45 088 A1 | 7/1982 |
| DE | 37 18 161 C1 | 7/1988 |
| EP | 0 570 758 A1 | 11/1993 |
| GB | 2 218 347 A | 11/1989 |

* cited by examiner

*Primary Examiner*—Timothy F. Simone
(74) *Attorney, Agent, or Firm*—Laurence A. Greenberg; Werner H. Stemer; Gregory L. Mayback

(57) ABSTRACT

A food processor includes a drive subassembly disposed in a housing and coupled, in drive terms, to a gearwheel connected, in its axis center, to a first driveshaft, which driveshaft is further provided with a drive pinion for a planet gear associated with the gearwheel and to the planet carrier of which is connected a further driveshaft that encloses the first driveshaft concentrically. The installation of a planet gear does not result in any increase in the overall volume if the gearwheel is cup-shaped and, on its lateral cup surface, has an outer tooth formation, and, furthermore, the fixed toothed ring of the planet gear is a cup-shaped hollow-wheel toothed ring and is inserted concentrically into the cup space of the gearwheel.

28 Claims, 2 Drawing Sheets

FOOD PROCESSOR

CROSS-REFERENCE TO RELATED APPLICATION

This application is a continuation of International Application No. PCT/EP01/02080, filed Feb. 23, 2001, which designated the United States and was not published in English.

BACKGROUND OF THE INVENTION

FIELD OF THE APPLICATION

The invention relates to a food processor having a drive subassembly that is disposed in the housing of the food processor and is coupled, in drive terms, to a gearwheel that is connected, in its axis center, to a first output shaft or driveshaft, which driveshaft is further provided with a drive pinion for a planet gear that is associate with the gearwheel and to the planet carrier of which is connected a further driveshaft, which encloses the first driveshaft concentrically.

In the case of such a commercially available food processor, the planet gear is disposed axially above the gearwheel, which results in an increase in the overall height in relation to a food processor without such a planet gear.

SUMMARY OF THE INVENTION

It is accordingly an object of the invention to provide a food processor that overcomes the hereinafore-mentioned disadvantages of the heretofore-known devices of this general type and that, despite the installation of a planet gear, the overall volume is not increased.

With the foregoing and other objects in view, there is provided, in accordance with the invention, a food processor, including a housing, a first driveshaft, a second driveshaft concentrically enclosing the first driveshaft, a cup-shaped gearwheel having a center axis, a lateral cup surface, and an outer tooth formation on the lateral cup surface, defining a cup space, and being connected to the first driveshaft substantially at the center axis, a drive subassembly disposed in the housing and coupled to the outer tooth formation of the gearwheel, a planet carrier connected to the second driveshaft, a planet gear associated with the gearwheel and the planet carrier, the planet gear having a cup-shaped hollow-wheel toothed ring inserted concentrically into the cup space of the gearwheel, and the first driveshaft having a drive pinion coupled to the planet gear.

According to the invention, the gearwheel is cup-shaped and, on its lateral cup surface, has an outer tooth formation. Also, the fixed toothed ring of the planet gear is configured as a cup-like hollow-wheel toothed ring and is inserted concentrically into the cup space of the gearwheel. The cup-like shape of the gearwheel provides a space for accommodating the planet gear. As a result, despite the installation of the planet gear, there is no increase in overall height in relation to a food processor without such a planet gear. In addition, the overall height of the food processor using the planet gear according to the invention is reduced in relation to food processors with conventional planet gears.

In accordance with another feature of the invention, a gear unit that can be handled independently is achieved in that one end of the first driveshaft is mounted on the bottom housing part of the food processor and the other end is mounted in a bearing mount provided on the lid of a mixing bowl associated with the food processor. The gearwheel and the hollow-wheel toothed ring, containing the planet wheels and the planet carriers thereof, may be joined together outside the food processor and, then, be fitted as a unit on the housing of the food processor.

In accordance with a further feature of the invention, the assembly of such a gear unit is aided if U-shaped carrying arms that engage over the lateral cup surface of the gearwheel and can be fastened on the housing are provided on the hollow-wheel toothed ring. The hollow-wheel toothed ring can, then, easily be fastened on the housing of the food processor.

In accordance with an added feature of the invention, the carrying arms are integrally formed on the toothed ring.

In accordance with an additional feature of the invention, the carrying arms are releasably mounted in a rotationally fixed manner on the housing.

In accordance with yet another feature of the invention, the carrying arms are secured by the housing at least one of in a form-lock and a force-lock, at least in an axial direction of the driveshaft.

In accordance with yet a further feature of the invention, the number of assembly operations is reduced further if the sun wheel of the planet gear is integrally formed on the inside of the cup base of the gearwheel.

In accordance with yet an added feature of the invention, sufficient cooling of the gear unit is achieved by placing fan blades on the outside of the cup base of the gearwheel. Because the fan blades are integrally formed on the cup base, there is no need for a separate operation for fitting the fan blades. These fan blades serve, at the same time, as stiffening ribs for the gearwheel.

In accordance with yet an additional feature of the invention, the gearwheel is configured, in a particularly favorable manner with respect to its torsional rigidity, if the fan blades taper in height in the direction of the center of the cup base.

In accordance with again another feature of the invention, the heat dissipation on the gearwheel is particularly favorable if the fan blades are curved counter to the direction of rotation of the gearwheel.

In accordance with again a further feature of the invention, the planet gear is connected to and, preferably, meshes with, the gearwheel and the planet carrier, the planet gear meshes with the gearwheel, and the drive pinion meshes with the planet gear.

In accordance with again an added feature of the invention, the planet carrier is fixedly connected to the second driveshaft, preferably, integral with the second driveshaft.

In accordance with again an additional feature of the invention, the first driveshaft, the second driveshaft, the gearwheel, the planet carrier, and the planet gear are disposed in the housing.

In accordance with a concomitant feature of the invention, the planet gear is mounted within the housing, with a particularly low level of noise being produced, if the carrying arms are mounted on the housing by elastically configured bearing elements. Such a configuration results in the coupling between the planet gear and the housing having a particularly sound-absorbing action.

Other features that are considered as characteristic for the invention are set forth in the appended claims.

Although the invention is illustrated and described herein as embodied in a food processor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
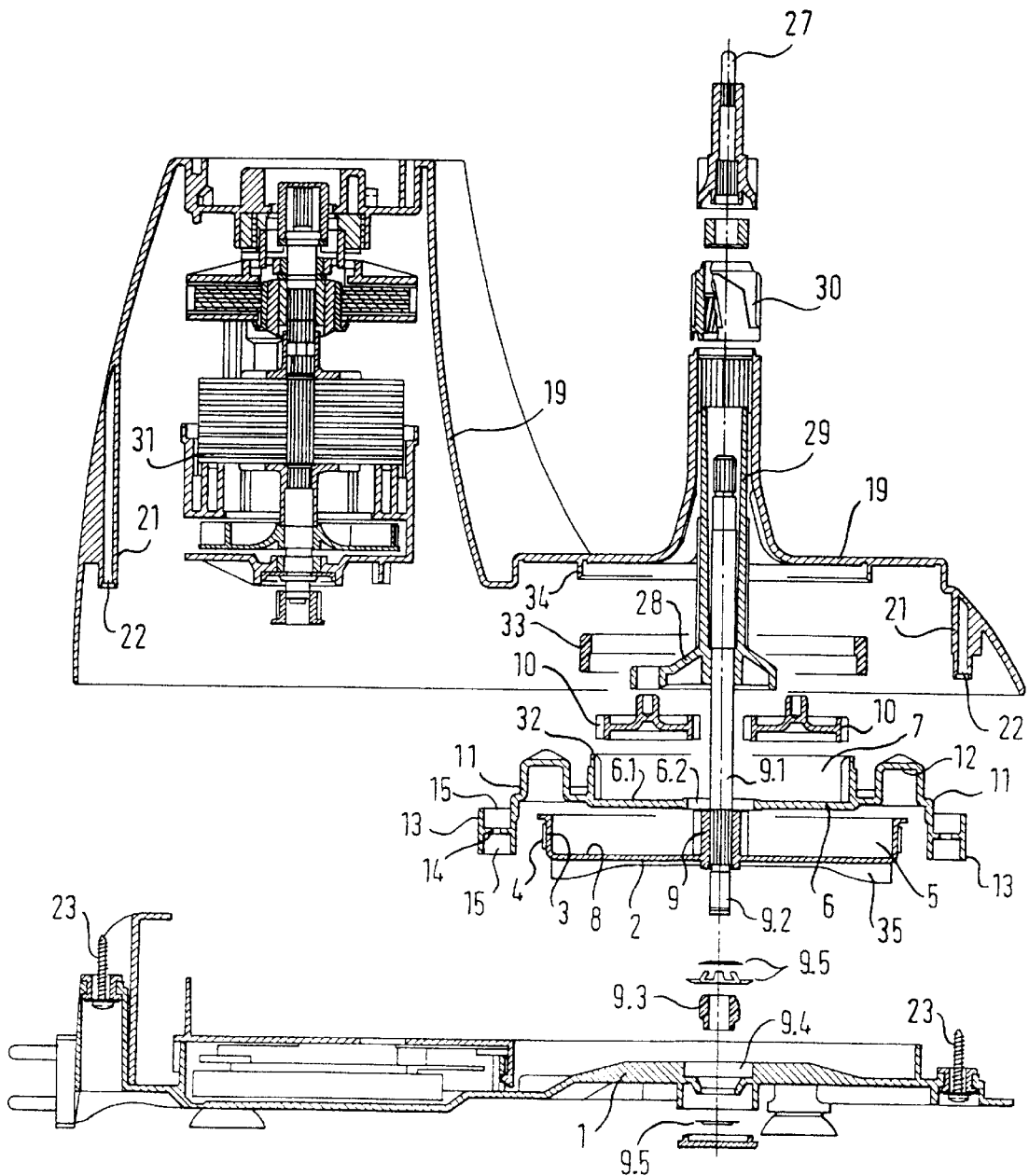
FIG. 1 is an exploded, cross-sectional view of a food processor according to the invention.
Figure 2:
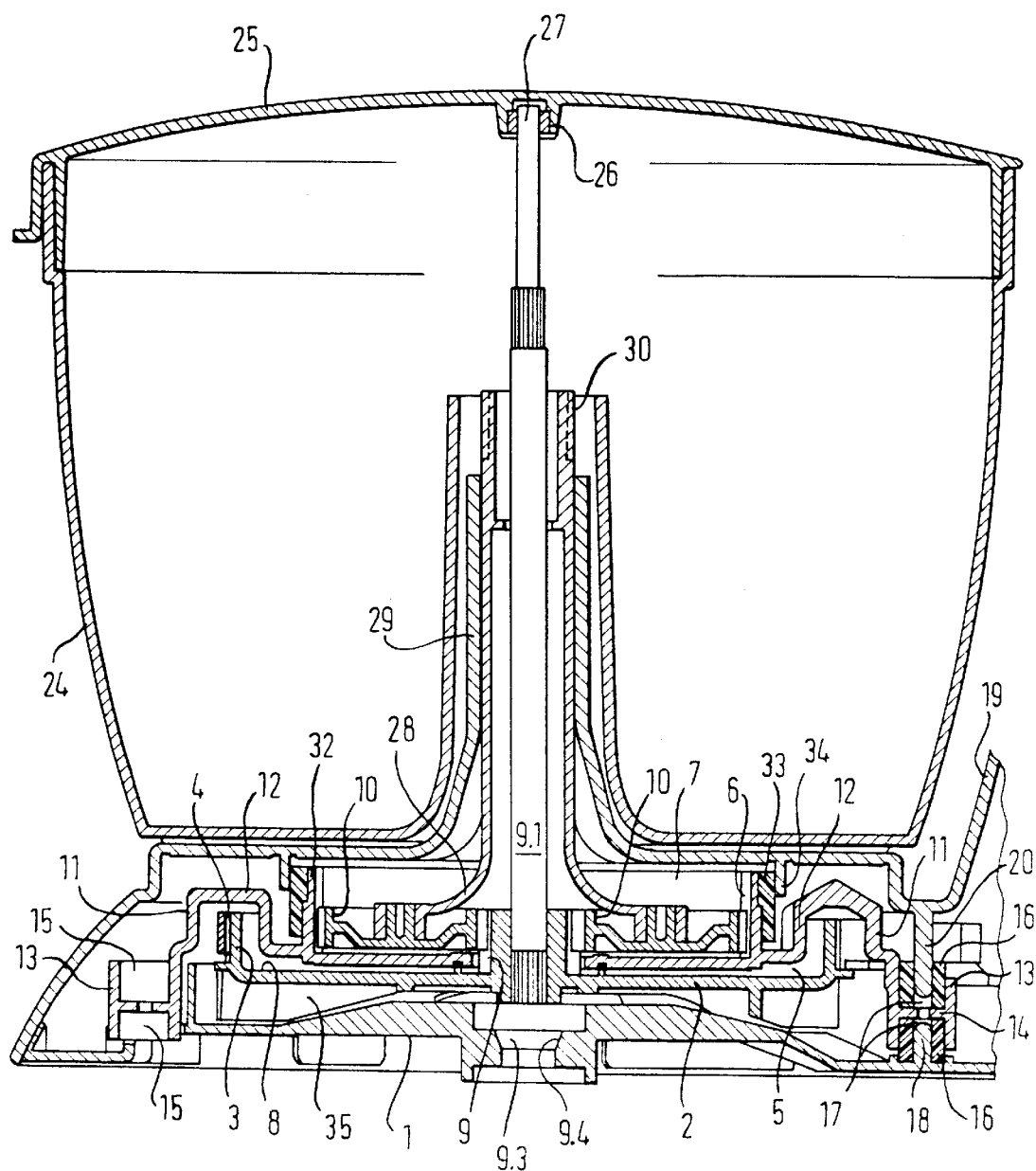
FIG. 2 is a fragmentary, cross-sectional view of a drive part of the food processor of FIG. 1 with a mixing bowl in position.

Referring now to the figures of the drawings in detail and first, particularly to FIG. 1 thereof, there is shown the bottom housing part 1 of a food processor. A cup-shaped gearwheel 2 is mounted rotatably thereon. The lateral cup surface 3 of the gearwheel 2 is provided with an outer tooth formation 4 for a toothed belt that is driven by the drive motor 31 of the food processor. Disposed in the cup space 5 of the gearwheel 2 is the fixed toothed ring of a planet gear, the toothed ring being configured as a hollow-wheel toothed ring 6 and its ring base 6.1 having a central through-passage 6.2.

Disposed in the interior 7 of the hollow-wheel toothed ring 6 are a plurality of planet wheels 10 that are driven by a sun wheel 9 integrally formed in the center of the cup base 8 of the gearwheel 2, the sun wheel 9 projecting through the through-passage 6.2 when the hollow-wheel toothed ring 6 has been fitted. Moreover, a first driveshaft 9.1 is connected in a rotationally fixed manner to the gearwheel 2 in the center of the cup base 8, the driveshaft 9.1 having a bearing journal 9.2 that, by way of an elastically constructed mount 9.3, is mounted in a bearing mount 9.4 for housing part 1 and, by way of a retaining device 9.5, is secured releasably on the housing part 1. Three radially outwardly projecting carrying arms 11 are integrally formed, at uniform circumferential intervals, on the outside of the toothed ring 6. The carrying arms 11 have a U-shaped inflection 12, by which they engage over the lateral cup surface 3 of the gearwheel 2. Located at the free end of the carrying arms 11 are sleeve-like fastening elements 13, which have a false floor 14 in the interior. The sleeve-like fastening elements 13, thus, form two mutually opposite mounts 15, into which is inserted respectively one tubular part 16 of elastic material and serving as a bearing element.

The tubular part 16 inserted in the mount 15 directed toward the bottom housing part 1 is plugged, by way of its tube opening 17, onto a stub 18 integrally formed on the bottom housing part 1. The toothed ring 6 is, thus, retained on the bottom housing part 1 in a rotationally fixed manner with noise insulation. The top housing part 19 of the food processor is plugged, by way of retaining stubs 20 integrally formed thereon, into the tube opening 17 of the tubular part 16 inserted into the top mount 15. The hollow-wheel toothed ring 6 is retained on the top housing part 19 not just through the carrying arms 11, but also through an elastic ring 33, which is plugged onto the cup border 32 of the toothed ring 6 and, when the top housing part 19 has been placed in position, engages in an annular collar 34 integrally formed thereon. Therefore, the carrying arms 11 are secured by the housing 19 in a form-locking and/or force-locking manner at least in an axial direction of the driveshaft 9.1. A form-locking connection is one that connects two elements together due to the shape of the elements themselves, as opposed to a force-locking connection, which locks the elements together by force external to the elements.

The configuration ensures good centering of the toothed ring 6. The entire gear unit and the bottom and top housing parts 1 and 19 can, thus, be preassembled simply by being plugged together. The housing parts 1 and 19 are fixedly connected to one another by screws 23, which are each screwed into a bore 22 provided in connecting stubs 21 of the top housing part 19.

A lid 25 is placed in position on the mixing bowl 24 of the food processor, the lid 25 having a central bearing mount 26 for the free end 27 of the first driveshaft 9.1. By virtue of mounting the free end of the first driveshaft 9.1 on the lid 25 of the mixing bowl 24, on one hand, and of mounting the bearing journal 9.2 in the housing part 9.1, on the other hand, the entire drive unit is mounted through the first driveshaft 9.1. Such a configuration makes it possible for the gear module including the gearwheel 2 and the planet gear (planet wheels 10 and toothed ring 6) and the driveshaft 9.1 to be prefabricated as a unit. The prefabricated unit may then be fitted on the bottom housing part 1, as has already been described, merely by being plugged thereon. Accordingly, production is simplified to a considerable extent. Thereafter, all that is still required is for the top housing part 19 to be placed in position and connected to the bottom housing part 1 by the screws 23.

A hollow shaft 29, which forms a further driveshaft, is connected to the planet carrier 28, which bears the planet wheels 10. The further driveshaft 29 rotates at a lower speed than the first driveshaft 9.1. Provided at the free end of the further driveshaft 29 is an output pinion 30, onto which it is possible to plug an appropriate attachment of the food processor, e.g., dough hooks or the like. Such a configuration results in suitable drive speeds being available for the various attachments.

Excessive heating of the gear module by the frictional heat produced in the gear may be prevented by fan blades 35 being provided on the outside of the cup base 8. These fan blades 35 cause a pronounced movement of air in the surroundings of the gear unit. Such air movement achieves good cooling of the gear unit. The fan blades 35 can be integrally formed in the cup base 8 of the gearwheel 2 as the gearwheel 2 is produced. As a result, the fan blades 35 require merely a certain outlay on material but no additional assembly outlay.

We claim:

1. A food processor, comprising:
   a housing;
   a first driveshaft;
   a second driveshaft concentrically enclosing said first driveshaft;
   a cup-shaped gearwheel:
      having a center axis, a lateral cup surface, and an outer tooth formation on said lateral cup surface;
      defining a cup space; and
      being connected to said first driveshaft substantially at said center axis;
   a drive subassembly disposed in said housing and coupled to said outer tooth formation of said gearwheel;
   a planet carrier connected to said second driveshaft;
   a planet gear associated with said gearwheel and said planet carrier, said planet gear having a cup-shaped hollow-wheel toothed ring inserted concentrically into said cup space of said gearwheel; and said first driveshaft having a drive pinion coupled to said planet gear.

2. The food processor according to claim 1, including a mixing bowl with a lid having a bearing mount, said housing having a bottom housing part, said first driveshaft having:
a first end mounted releasably on said bottom housing part; and
a second end mounted in said bearing mount of said lid.

3. The food processor according to claim 1, wherein:
said housing has a bottom housing part;
said first driveshaft is adapted to receive a mixing bowl having a lid with a bearing mount; and
said first driveshaft has:
a first end mounted releasably on said bottom housing part; and
a second end adapted to be mounted in the bearing mount of the lid.

4. The food processor according to claim 1, wherein said toothed ring of said planet gear has carrying arms disposed over said lateral cup surface of said gearwheel and adapted to be fastened to said housing.

5. The food processor according to claim 1, wherein said toothed ring of said planet gear has carrying arms disposed over said lateral cup surface of said gearwheel and fastened to said housing.

6. The food processor according to claim 4, wherein said carrying arms are U-shaped.

7. The food processor according to claim 4, wherein said carrying arms are integrally formed on said toothed ring.

8. The food processor according to claim 4, wherein said carrying arms are releasably mounted in a rotationally fixed manner on said housing.

9. The food processor according to claim 8, including elastic bearing elements mounting said carrying arms to said housing.

10. The food processor according to claim 4, wherein said carrying arms are secured by said housing at least one of in a form-lock and a force-lock.

11. The food processor according to claim 4, wherein said carrying arms are secured by said housing at least one of in a form-lock and a force-lock, at least in an axial direction of said driveshaft.

12. The food processor according to claim 1, wherein:
said gearwheel has a cup base with an inside surface; and
said planet gear has a sun wheel integrally formed on said inside surface.

13. The food processor according to claim 1, wherein:
said cup space has a bottom; and
said gearwheel has an integral sun wheel formed on said bottom of said cup space inside said gearwheel.

14. The food processor according to claim 1, wherein:
said gearwheel has a cup base with an outside surface; and
fan blades are disposed on said outside surface.

15. The food processor according to claim 12, wherein:
said cup base has an outside surface; and
fan blades are disposed on said outside surface.

16. The food processor according to claim 7, wherein said gearwheel has a cup base with integrally formed fan blades.

17. The food processor according to claim 14, wherein:
said cup base has a center; and
said fan blades taper in height in a direction of said center of said cup base.

18. The food processor according to claim 15, wherein:
said cup base has a center; and
said fan blades taper in height in a direction of said center of said cup base.

19. The food processor according to claim 16, wherein:
said gearwheel rotates in a rotation direction; and
said fan blades are curved counter to said rotation direction of said gearwheel.

20. The food processor according to claim 16, wherein:
said gearwheel rotates in a rotation direction; and
said fan blades are curved counter to said rotation direction of said gearwheel.

21. The food processor according to claim 17, wherein:
said gearwheel rotates in a rotation direction; and
said fan blades are curved counter to said rotation direction of said gearwheel.

22. The food processor according to claim 1, wherein said planet gear is connected to said gearwheel and to said planet carrier.

23. The food processor according to claim 22, wherein:
said planet gear meshes with said gearwheel; and
said drive pinion meshes with said planet gear.

24. The food processor according to claim 1, wherein said planet carrier is fixedly connected to said second driveshaft.

25. The food processor according to claim 24, wherein said planet carrier is integral with said second driveshaft.

26. The food processor according to claim 1, wherein said first driveshaft, said second driveshaft, said gearwheel, said planet carrier, and said planet gear are disposed in said housing.

27. A food processor, comprising:
a housing;
a first driveshaft;
a second driveshaft adapted to concentrically enclose said first driveshaft;
a cup-shaped gearwheel:
having a center axis, a lateral cup surface, and an outer tooth formation on said lateral cup surface;
defining a cup space; and
adapted to connect to said first driveshaft substantially at said center axis;
a drive subassembly adapted to be coupled to said outer tooth formation of said gearwheel;
a planet carrier adapted to be connected to said second driveshaft;
a planet gear adapted to associate with said gearwheel and said planet carrier, said planet gear having a cup-shaped hollow-wheel toothed ring adapted to be inserted concentrically into said cup space of said gearwheel; and
said first driveshaft having a drive pinion adapted to be coupled to said planet gear.

28. A food processor, comprising:
a housing;
a first driveshaft having two ends;
a second driveshaft having two ends each concentrically surrounding said first driveshaft, said ends of said first drive shaft extending beyond said respective ends of said second drive shaft;
a cup-shaped gearwheel:
having a center axis, a lateral cup surface, and an outer tooth formation on said lateral cup surface;
defining a cup space; and
being connected to said first driveshaft substantially at said center axis;

a drive subassembly disposed in said housing and coupled to said outer tooth formation of said gearwheel;

a planet carrier connected to said second driveshaft;

a planet gear associated with said gearwheel and said planet carrier, said planet gear having a cup-shaped hollow-wheel toothed ring inserted concentrically into said cup space of said gearwheel; and said first driveshaft having a drive pinion coupled to said planet gear.

* * * * *